United States Patent
Visinescu et al.

(10) Patent No.: US 10,691,447 B2
(45) Date of Patent: Jun. 23, 2020

(54) WRITING SYSTEM SOFTWARE ON AN ELECTRONIC DEVICE

(71) Applicant: BlackBerry Limited, Waterloo (CA)

(72) Inventors: Catalin Visinescu, Kitchener (CA); Byron Hummel, Kitchener (CA); Zhi Jun Mo, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 288 days.

(21) Appl. No.: 15/288,377

(22) Filed: Oct. 7, 2016

(65) Prior Publication Data

US 2018/0103029 A1    Apr. 12, 2018

(51) Int. Cl.

| | |
|---|---|
| *G06F 7/04* | (2006.01) |
| *G06F 15/16* | (2006.01) |
| *G06F 17/00* | (2019.01) |
| *H04L 29/06* | (2006.01) |
| *G06F 8/654* | (2018.01) |
| *G06F 9/4401* | (2018.01) |
| *G06F 21/57* | (2013.01) |
| *G06F 21/31* | (2013.01) |

(52) U.S. Cl.
CPC ............ *G06F 8/654* (2018.02); *G06F 9/4401* (2013.01); *G06F 9/4406* (2013.01); *G06F 21/31* (2013.01); *G06F 21/575* (2013.01)

(58) Field of Classification Search
CPC ....... H04L 63/083; H04L 63/10; G06F 8/654; G06F 9/4406; G06F 21/575; G06F 21/602
See application file for complete search history.

(56) References Cited

U.S. PATENT DOCUMENTS

| | | | |
|---|---|---|---|
| 6,148,404 A * | 11/2000 | Yatsukawa | G06F 21/335 380/30 |
| 7,200,761 B1 * | 4/2007 | Freeman | G06F 11/2284 709/223 |
| 2003/0212871 A1 * | 11/2003 | Suzuki | G06F 12/1466 711/164 |
| 2006/0143450 A1 * | 6/2006 | Airody Udupa | G06F 21/31 713/168 |
| 2008/0003980 A1 * | 1/2008 | Voss | H04L 63/0853 455/411 |
| 2009/0055914 A1 * | 2/2009 | Azami | G06F 21/121 726/7 |
| 2009/0089526 A1 * | 4/2009 | Kuo | G06F 21/79 711/163 |

(Continued)

*Primary Examiner* — John B King
*Assistant Examiner* — Darshan I Dhruv
(74) *Attorney, Agent, or Firm* — Fish & Richardson P.C.

(57) ABSTRACT

Systems, methods, and software can be used to write system software on an electronic device. In some aspects, an instruction to write system software on an electronic device is received from a booting device that is different than the electronic device. In response to the instruction, a boot loader on the electronic device is invoked. A password is received from the booting device. Whether the received password matches a high level operating system (HLOS) password stored on the electronic device is determined. If the received password matches the HLOS password, the system software is written on the electronic device. If the received password does not match the HLOS password, the writing of the system software is halted.

9 Claims, 2 Drawing Sheets

(56) References Cited

U.S. PATENT DOCUMENTS

| | | | |
|---|---|---|---|
| 2010/0205425 A1* | 8/2010 | Takacs | G06F 21/32 |
| | | | 713/100 |
| 2010/0325622 A1* | 12/2010 | Morton | G06F 8/654 |
| | | | 717/168 |
| 2012/0042376 A1* | 2/2012 | Dolgunov | G06F 9/4406 |
| | | | 726/19 |
| 2013/0014269 A1* | 1/2013 | Chang | G06F 21/79 |
| | | | 726/26 |
| 2013/0262872 A1* | 10/2013 | Xu | G06F 21/31 |
| | | | 713/183 |
| 2014/0189885 A1* | 7/2014 | Golan | G06F 21/32 |
| | | | 726/28 |
| 2016/0266838 A1* | 9/2016 | Jung | G06F 9/4416 |
| 2017/0090909 A1* | 3/2017 | Guo | G06F 8/66 |

* cited by examiner

WRITING SYSTEM SOFTWARE ON AN ELECTRONIC DEVICE

TECHNICAL FIELD

The present disclosure relates to writing system software an electronic device.

BACKGROUND

In some cases, electronic devices, including mobile devices or other computer systems, can initiate a system software writing operation on the electronic device. The system software provides an interface between the hardware of the electronic device and the user applications installed on the electronic device. System software can include computer programs that operates the hardware, executes the application programs on the electronic device, or a combination thereof. In some cases, system software can include firmware drivers, high level operating system (HLOS), or a combination thereof.

DESCRIPTION OF DRAWINGS

Like reference numbers and designations in the various drawings indicate like elements.

DETAILED DESCRIPTION

In some cases, during a system upgrade process, a new version of the system software can be written on the memory of the electronic device. The new version of the system software can overwrite the previous version of the system software. In some cases, the system software can include a high level operating system (HLOS) of the electronic device.

In some cases, the system upgrade process can be performed under the control of a user of the electronic device. For example, the system software update can be sent to the electronic device using a wireless connection. The HLOS of the electronic device can generate a system update notification and output the notification on the electronic device. The user can initiate a system upgrade process to load the update. In some cases, the user can input a password to confirm that identity of the user before the system upgrade process proceeds. Because the system upgrade process is initiated under the control of the HLOS of the electronic device, the user can use the HLOS password to confirm the system update process. The HLOS password can be the same password that the user uses to control the electronic device, e.g., to unlock a screen or to reboot the electronic device. The user can set and change the HLOS password using the password setting features provided by the HLOS of the electronic device.

Alternatively, the system upgrade process can be performed using a booting device connected to the electronic device. For example, in a fastboot operation, a booting device is connected to the electronic device and can write the system software on the electronic device without launching the HLOS of the electronic device. In some cases, the booting device can request a passcode verification before the system software is written. However, the passcode may not be the same as the HLOS password stored on the electronic device. Instead, the passcode may be set by a developer of the electronic device. In one example, a user can register the electronic device on a website of the manufacturer of the electronic device and receive a passcode. In another example, the passcode can be set in the system Basic Input/Output (BIOS) of the electronic device, and cannot be changed by the user after the electronic device is manufactured. This presents a security risk, as someone other than the user can obtain the electronic device and the passcode, connect the electronic device with a booting device, and write a malicious system software on the electronic device without using the user-set HLOS password to confirm the identity of the electronic device.

Figure 1:
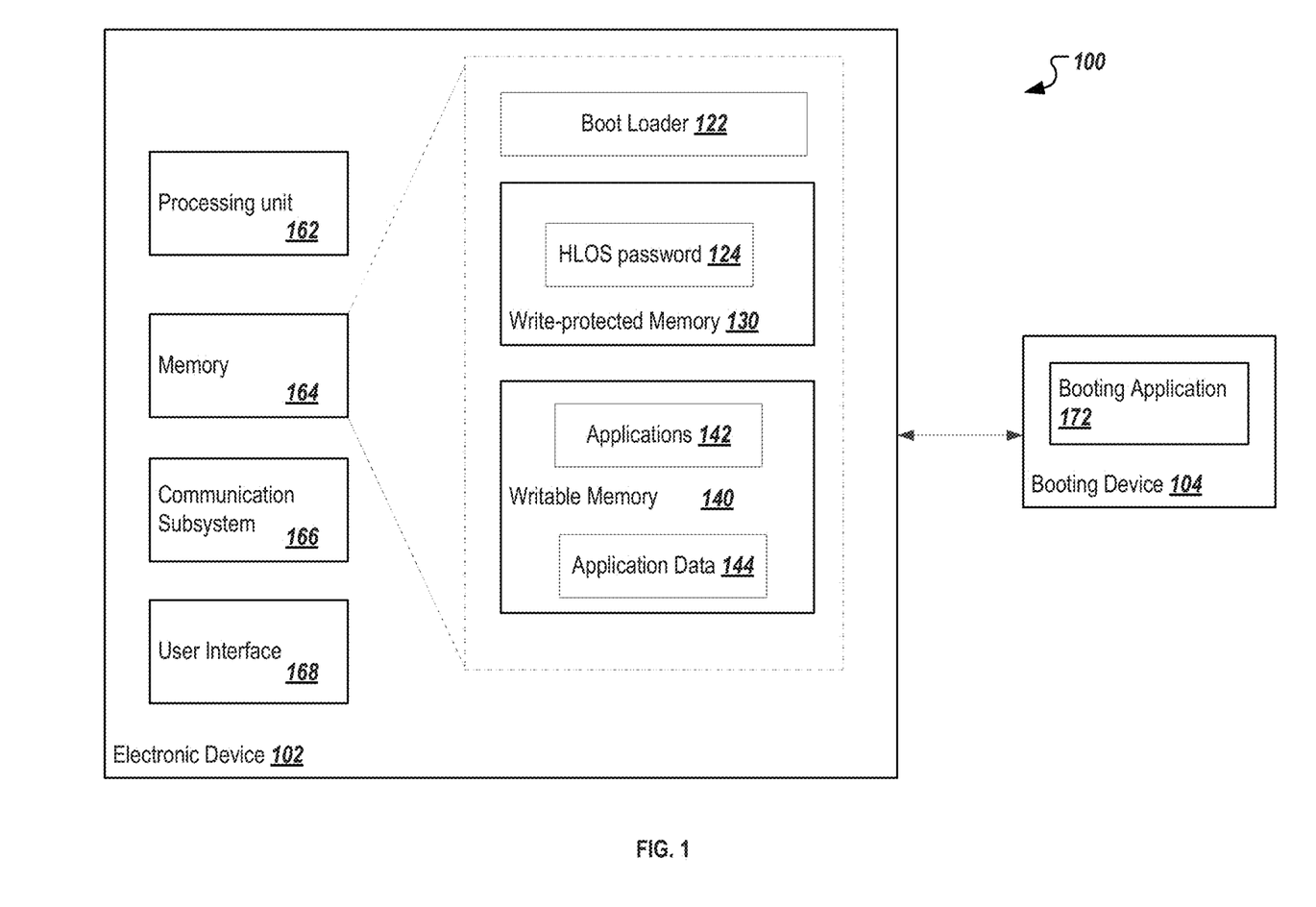
FIG. 1 is a schematic diagram showing the electronic device that writes system software according to an implementation.
Figure 2:
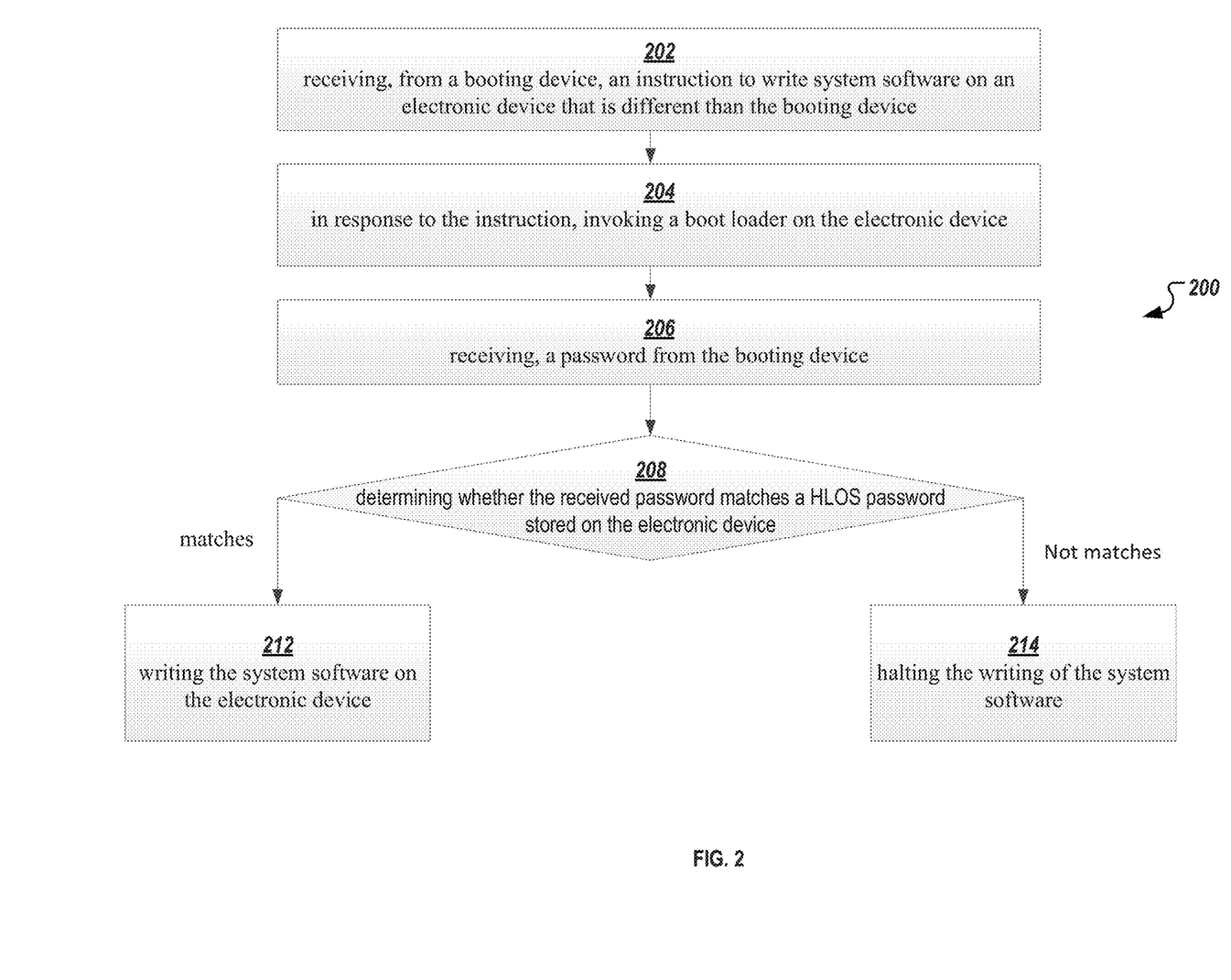
FIG. 2 is a flow diagram showing an example process for writing system software on an electronic device according to an implementation.

In some cases, a password verification function is inserted in the system writing operation. The password verification function can be executed by a boot loader on the electronic device. The boot loader is a software stored on the electronic device that can be executed to manage booting operations, including writing the system software onto the electronic device. The boot loader has access to the HLOS password stored on the electronic device. The boot loader receives a password from the booting device and determines whether the received password matches the stored HLOS password. In some cases, the HLOS password is encrypted and stored on a write-protected memory of the electronic device. In these or other cases, the HLOS is decrypted before being compared with the received password. The boot loader continues the system software writing process if the received password matches the stored HLOS password. Therefore, the identity of the user can be confirmed through the user-set HLOS password before the system writing operation is processed. FIGS. 1-3 and associated descriptions provide additional details of these implementations.

FIG. 1 is a schematic diagram 100 showing the electronic device 102 that writes system software according to an implementation. As illustrated, the electronic device 102 is connected with a booting device 104.

The booting device 104 represents an application, a set of applications, software, software modules, hardware, or any combinations thereof that can be configured to instruct the electronic device 102 to initiate a system software writing process. In some cases, the booting device 104 can be implemented using a computer. The booting device 104 can provide a user interface for the system software writing process. For example, the booting device 104 can receive a user input to initiate the system software writing process, output a request for a user to input a password, receive a user input for a password, report a password verification error, or any combinations thereof. FIG. 2 and associated descriptions provide additional details of these implementations. In some cases, the booting device 104 can also store the system software to be written on the electronic device 102.

The booting device 104 can be connected with the electronic device using a wireline connection, e.g., a Universal Serial Bus (USB) cable. In some cases, the booting device can be connected with the electronic device using other wireline connection devices, e.g., a twisted pair cable or a coaxial cable, or using wireless communication protocols.

The booting device 104 includes a booting application 172. The booting application 172 represents an application, a set of applications, software, software modules, hardware, or any combinations thereof that can be configured to manage a system software writing process at the booting device 104. For example, the booting application 172 can generate an instruction to initiate the system software writing process and send the instruction to the electronic device 102. The booting application 172 can also process the password verification result received from the electronic device 102 and request additional user input. FIG. 2 and associated descriptions provide additional details of these implementations. In some cases, the booting application 172 can also send the system software from the booting device 104 to the electronic device 102.

The electronic device 102 includes a processing unit 162, a communication subsystem 166, a user interface 168, and memory 164. An electronic device may include additional, different, or fewer features, as appropriate.

The example processing unit 162 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 162 can be configured to generate control information, such as a measurement report, or respond to received information, such as control information from a network node. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receiver in the communication subsystem 166 can be an advanced receiver or a baseline receiver. Two receivers can be implemented with identical, similar, or different receiver processing algorithms.

The example user interface 168 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of the electronic device 102 and various other computer-executable software programs for performing one or more of the processes, steps, or actions described above. As illustrated, the memory 164 can include a write-protected memory 130 and a writable memory 140.

In some cases, the memory 164 can store a boot loader 122. The boot loader 122 is a software that can be executed to perform a booting operation, including writing system software on the electronic device 102. In some cases, the boot loader 122 can include more than one software entities that perform the system software writing process in consecutive stages. For example, the boot loader 122 can include a primary boot loader that performs a first stage of the system software writing process and invokes a secondary boot loader to perform a first stage of the system software writing process. In some cases, the boot loader 122, or a portion of the boot loader 122, can be stored on a ROM. The ROM can be coupled with the processing unit 162 in a system on chip (SoC) platform. Alternatively or in combination, the boot loader 122, or a portion of the boot loader 122, can be stored on the write-protected memory 130.

The boot loader 122 can include computer-readable instructions that, when executed, can cause the processing unit 162 to execute a system software writing process in response to instructions received from the booting device 104. The instructions can include instructions to verify whether a received password matches a HLOS password stored on the electronic device 102. If the received password matches the stored HLOS password, the system software writing process can continue. Otherwise, the system software writing process can be halted. In some cases, the boot loader 122 can report the password verification failure to the booting device 104 to request a user to enter a new password. FIG. 2 and associated descriptions provide additional details of these implementations.

As illustrated, the memory 164 includes the write-protected memory 130. The write-protected memory 130 includes one or more memory devices that can be accessed, e.g., read, written, or a combination thereof, by only a selected group of system software that has the privilege to alter the system software on the electronic device. Examples of the system software having the privilege include a boot loader, HLOS software that has a root privilege, and trust-zone extensions that will be discussed in following sections. One example of the memory devices that can be used to implement the write-protected memory 130 is a Replay Protected Memory Block (RPMB). In some cases, non-volatile random-access memory (NVRAM) can also be used to implement the write-protected memory 130. In some cases, the RPMB can have a higher level of write protection, e.g., accessible by a smaller number of system software, than the NVRAM.

The write-protected memory 130 can store the HLOS password 124. The HLOS password 124 represents a password that is associated with the HLOS of the electronic device 102. The HLOS password 124 can be used by the user to unlock a screen of the electronic device 102, restart the electronic device 102, or access one or more applications. The HLOS password 124 can be set and changed by a user of the electronic device 102, e.g., using the password setting user interface of the HLOS of the electronic device. In some cases, the HLOS password 124 can be created using alphanumerical texts, gestures, fingerprints, or any other password creating mechanism. In some cases, the HLOS password 124 can be encrypted. FIG. 2 and associated descriptions provide additional details of these implementations.

As illustrated, the memory 164 also includes the writable memory 140. The writable memory 140 includes one or more memory devices that can be overwritten by applications on the electronic device 102. Examples of the writable memory 140 include one or more hard disks, RAMs, and removable media. As illustrated, the writable memory 140 can store applications 142 and application data 144. Application data 144 can include various types of data, e.g., files, classes, frameworks, backup data, business objects, jobs, web pages, web page templates, database tables, repositories storing business or dynamic information, and other information including parameters, variables, algorithms, instructions, rules, constraints, or references thereto. Application data 144 may include information that is associated with an application, a network, a user, and other information.

The applications 142 can include programs, modules, scripts, processes, or other objects that can execute, change, delete, generate, or process application data 144. For example, applications 142 can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the electronic device 102, one or more processes associated with an application 142 may be stored, referenced, or executed remotely. For example, a portion of an application 142 may be an interface to a web service that is remotely executed. Moreover, an application 142 may be a child or sub-module of another software module (not illustrated).

Turning to a general description, an electronic device, e.g., the electronic device 102, may include, without limitation, any of the following: computing device, mobile device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices, having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example process 200 for writing system software on an electronic device according to an implementation. The process 200 can be implemented by an electronic device, e.g., the electronic device 102 shown in FIG. 1. The process 200 shown in FIG. 2 can also be implemented using additional, fewer, or different entities. Furthermore, the process 200 shown in FIG. 2 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 200 begins at 202, where an instruction to write system software on an electronic device is received from a booting device that is connected with the electronic device. The booting device includes a booting application that is configured to manage the system software writing process on the booting device.

In some cases, the command to write the system software can be initiated by a user. For example, a user can connect the electronic device with the booting device, and launch the booting application to initiate a system software upgrade process. The booting application can send an instruction to the electronic device to indicate that a system software writing operation is initiated.

At 204, a boot loader stored on the electronic device is invoked by the instruction from the booting device. The boot loader is a software that can be executed to manage booting operations, including writing the system software onto the electronic device.

At 206, the boot loader receives a password from the booting device. In some cases, the password can be requested by the boot loader, the booting application, or a combination thereof. For example, the boot loader can include computer-readable instructions that checks whether a password is received before proceeding with the system software writing process. If a password has not been received yet, the boot loader can generate a request for password and send the request to the booting application on the booting device. The booting application can output the request using the user interface of the booting device, e.g., outputting an icon, dialogue box, command line prompt. The user can input the password in response and the booting application can send the password to the electronic device. Alternatively or in combination, the password can be received by the boot loader without a request. For example, when the user launches the booting application on the booting device, the user can input the password to the booting application. The booting application can send the password to the boot loader along with the instruction to write the system software at step 202.

At 208, the boot loader determines whether the received password matches a HLOS password stored on the electronic device. In some cases, the HLOS password can be encrypted. In these cases, the HLOS password can be decrypted before being compared with the received password.

In some cases, the electronic device can be configured to include a secure execution environment that is isolated from the operating environment from the generating operating system of the electronic device. An example of the secure execution environment is a trustzone (TZ). The TZ can include a set of security extensions that can be used to execute security operations with an increased level of security. Examples of the security operations executed in the TZ can include generating, requesting, or updating a certificate, encrypting or decrypting a content, and generating or authenticating a signature. The security extensions can have access to security related data, e.g., keys or certificates, to execute the security operations. In some cases, the TZ is implemented using hardware processors to provide additional security.

In some implementations, when the electronic device receives the HLOS password that is inputted by the user, the electronic device encrypts the HLOS password in the TZ and stored the encrypted HLOS password in the write-protected memory.

In some implementations, the boot loader can access the write-protected memory to retrieve to encrypted HLOS password, and perform the password verification operation in the TZ. The security extensions in the TZ can be used to decrypt the encrypted HOLS password, compare the decrypted HLOS password with the password received from the booting device, and return the comparison result to the boot loader to indicate whether the received the received password matches the decrypted HLOS. Based on the comparison result, the boot loader can determine whether the received the received password matches the decrypted HLOS.

If the received password matches the HLOS password, at 212, the boot loader writes the system software on the electronic device. In some cases, writing the system software includes loading a system image on the electronic device. The system image can include an updated version of HLOS of the electronic device. By loading the updated version of the system image, the previous version of the HLOS is replaced. In some cases, the boot loader can determine whether the system image is corrupted before loading the system image. For example, the updated version of the system image can be signed by the developer of the HLOS. The developer can generate a signature using its private key according to a cryptographic security algorithm. Examples of the cryptographic algorithms include Secure Hash Algorithm (SHA)-512, Elliptic curve cryptography (ECC) 521, other security functions or procedures, or any combinations thereof. The boot loader can validate the updated version of the system image based on the signature using the public key of the developer. If the signature verification succeeds, the updated version of the system image is determined to not be corrupted and the updated version of the system image is loaded on the electronic device. If the signature verification fails, the updated version of the system image is determined to be corrupted and would not be loaded on the electronic device.

If the received password matches the HLOS password, at 214, the boot loader halts the writing of the system software on the electronic device. In some cases, the boot loader can send an indication to the booting device, indicating a password verification error. The booting application can output an error indication on the user interface of the booting device. The user can input a second password. The booting application can send the second password to the boot loader. The boot loader can determine whether the second password matches the stored HLOS password.

In some cases, the boot loader, the booting application, or a combination thereof can keep a counter of consecutive erroneous passwords. If the number of consecutive password verification failures exceeds a configured threshold, a security breach alert can be generated. In response to the security breach alert, the boot loader can execute security breach operations. One example of the security breach operations is deleting the information stored on the electronic device, including applications, data, and HLOS.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus, for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatus with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may, instead, include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
receiving, by an electronic device and from a booting device, an instruction to write system software on the electronic device that is different than the booting device, wherein the system software includes a version of a high level operating system (HLOS) of the electronic device;
in response to the instruction, invoking a boot loader that is stored on the electronic device prior to the electronic device receiving the instruction to write system software on the electronic device;
sending, by the boot loader on the electronic device, a request for password to the booting device;
in response to the request for password, receiving, by the boot loader on the electronic device, a password from the booting device;
determining, by the boot loader, whether the received password matches a high level operating system (HLOS) password stored on the electronic device, wherein the HLOS password is stored on a Replay Protected Memory Block (RPMB) of the electronic device; and
performing, by the boot loader, one of the following operations:
when the received password matches the HLOS password, writing the system software on the electronic device; or
when the received password does not match the HLOS password, halting the writing of the system software.

2. The method of claim 1, further comprising: when the received password does not match the HLOS password:
reporting a password error to the booting device; and
receiving a second password in response to the reporting.

3. The method of claim 1, wherein the HLOS password is encrypted.

4. An electronic device, comprising:
a non-transitory memory storing a high level operating system (HLOS) password, wherein the HLOS password is stored on a Replay Protected Memory Block (RPMB) of the electronic device; and
at least one hardware processor configured to:
receive, by the electronic device and from a booting device that is different than the electronic device, an instruction to write system software on the electronic device, wherein the system software includes a version of a HLOS of the electronic device;
in response to the instruction, invoke a boot loader that is stored on the electronic device prior to the electronic device receiving the instruction to write system software on the electronic device;
send, by the boot loader on the electronic device, a request for password to the booting device;
in response to the request for password, receive, by the boot loader on the electronic device, a password from the booting device;
determine, by the boot loader, whether the received password matches the HLOS password; and
perform, by the boot loader, one of the following operations:
when the received password matches the HLOS password, write the system software on the electronic device; or
when the received password does not match the HLOS password, halt the writing of the system software.

5. The electronic device of claim 4, wherein the at least one hardware processor is further configured to: when the received password does not match the HLOS password:
report a password error to the booting device; and
receive a second password in response to the reporting.

6. The electronic device of claim 4, wherein the HLOS password is encrypted.

7. One or more non-transitory computer-readable media containing instructions which, when executed, cause an electronic device to perform operations comprising:
receiving, by the electronic device and from a booting device, an instruction to write system software on the electronic device that is different than the booting device, wherein the system software includes a version of a high level operating system (HLOS) of the electronic device;

in response to the instruction, invoking a boot loader that is stored on the electronic device prior to the electronic device receiving the instruction to write system software on the electronic device;

sending, by the boot loader on the electronic device, a request for password to the booting device;

in response to the request for password, receiving, by the boot loader on the electronic device, a password from the booting device;

determining, by the boot loader, whether the received password matches a high level operating system (HLOS) password stored on the electronic device, wherein the HLOS password is stored on a Replay Protected Memory Block (RPMB) of the electronic device; and performing, by the boot loader, one of the following operations:
 when the received password matches the HLOS password, writing the system software on the electronic device; or
 when the received password does not match the HLOS password, halting the writing of the system software.

8. The one or more non-transitory computer-readable media of claim 7, the operations further comprising: when the received password does not match the HLOS password:
 reporting a password error to the booting device; and
 receiving a second password in response to the reporting.

9. The one or more non-transitory computer-readable media of claim 7, wherein the HLOS password is encrypted.

* * * * *